United States Patent
Iwazaki

(10) Patent No.: US 6,230,110 B1
(45) Date of Patent: May 8, 2001

(54) WHEEL VELOCITY DETECTING APPARATUS

(75) Inventor: Katsuhiko Iwazaki, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/236,315

(22) Filed: Jan. 26, 1999

(30) Foreign Application Priority Data

Feb. 2, 1998 (JP) .................................................. 10-020564

(51) Int. Cl.$^7$ ........................................................ G01P 3/00
(52) U.S. Cl. ............................................. 702/148; 702/145
(58) Field of Search ................................... 702/148, 147, 702/145; 701/70; 73/121; 188/137; 340/936

(56) References Cited

U.S. PATENT DOCUMENTS

| | | | |
|---|---|---|---|
| 3,996,590 | * 12/1976 | Hammack | 342/465 |
| 4,669,046 | * 5/1987 | Kubo | 701/76 |
| 5,043,658 | 8/1991 | Braschel et al. | |
| 5,541,859 | * 7/1996 | Inoue et al. | 702/148 |
| 5,566,094 | * 10/1996 | Kojima et al. | 702/87 |
| 5,748,503 | * 5/1998 | Saeki et al. | 702/87 |

FOREIGN PATENT DOCUMENTS

| | | | |
|---|---|---|---|
| 4342868 A1 | 12/1993 | (DE) | G01D/1/00 |
| 3-018759 | 1/1991 | (JP) . | |
| 8-281125 | 10/1997 | (JP) . | |

OTHER PUBLICATIONS

Patents Abstracts of Japan, Feb. 23, 1984 vol. 8 No. 42.

* cited by examiner

*Primary Examiner*—Marc S. Hoff
*Assistant Examiner*—Edward Raymond
(74) *Attorney, Agent, or Firm*—Kenyon & Kenyon

(57) ABSTRACT

A wheel velocity detecting apparatus capable of accurately detecting a very low velocity (10 km/h or lower). A frequency signal corresponding to the rotational speed of a wheel is detected by a rotary sensor and converted by an A/D converter into a digital signal. A processor processes the digital sensor signal to detect a wheel velocity. Specifically, when the sensor signal is expressed by $y=f(\omega)\cos(\omega t)$, the difference between the output derived by squaring the signal and the output derived by multiplying a time-differentiated version of the signal by a time-integrated version of the signal is calculated to finally derive $f^2(\omega)$. Since $f(\omega)$ is uniquely determined in accordance with the rotational speed ($\omega$), the wheel velocity can be accurately detected even in a very low velocity range.

6 Claims, 6 Drawing Sheets

WHEEL VELOCITY DETECTING APPARATUS

BACKGROUND OF THE INVENTION

1. Field of the Invention

The present invention relates generally to a wheel velocity detecting apparatus and, more particularly, to an apparatus which has improved accuracy in detecting a wheel velocity chiefly in a low velocity range by processing a signal from a rotary sensor (pickup sensor).

2. Description of the Related Art

Conventionally there is known a wheel velocity detecting apparatus for detecting a signal from an electromotive force or a frequency corresponding to the rotational speed of wheels by a pickup coil arranged near a wheel and converting the signal into a square wave to detect a wheel velocity based on an edge interval of the square wave.

For example, Japanese Patent Laid-Open Publication No. Hei 3-18756 discloses a technique for detecting a wheel velocity by generating a square wave of duty ratio 1:1 from a sensor signal to detect a wheel velocity based on an edge interval of the square wave pulse and the circumference of the wheel.

However, when a wheel velocity is detected by generating a square wave pulse from a sensor signal at a very low velocity (for example, 10 km/h or lower), an edge is not inputted in time, even at the updating timing of the wheel velocity, so that the wheel velocity has to be derived from an estimation, which causes a problem of prohibiting accurate detection of the wheel velocity.

It is naturally conceivable that a wheel velocity may be uniformly set at 0 km/h during a very low velocity, but this does not solve the problem, as a wheel velocity still fails to be accurately detected.

SUMMARY OF THE INVENTION

The present invention has been made to solve the above described problem inherent in the prior art technique, and an object thereof is to provide a wheel velocity detecting apparatus capable of detecting a wheel velocity at high accuracy in a very low velocity range (10 km/h or lower).

In order to achieve the above mentioned object, the present invention provides a wheel velocity detecting apparatus for detecting the wheel velocity based on a signal from a rotary sensor, comprising a differentiator for time-differentiating the signal from the rotary sensor, an integrator for time-integrating the signal from the rotary sensor, a squarer for squaring the signal from the rotary sensor, a multiplier for multiplying the output from the differentiator by the output from the integrator, a subtractor for calculating the difference between the output from the squarer and the output from the multiplier, and a detector for detecting a wheel velocity based on the output from the subtractor.

The present invention is also a wheel velocity detecting apparatus for detecting a wheel velocity based on a signal from a rotary sensor, comprising a first differentiator for time-differentiating the signal from the rotary sensor, a second differentiator for time-differentiating the signal from the first differentiator, an integrator for time-integrating the signal from the first differentiator, a squarer for squaring the signal from the first differentiator, a multiplier for multiplying the output from the second differentiator by the output from the integrator, a subtractor for calculating the difference between the output from the squarer and the output from the multiplier, and a detector for detecting the wheel velocity based on the output from the subtractor.

The wheel velocity detecting apparatus according to the present invention also comprises a first differentiator for time-differentiating a signal from a rotary sensor, a second differentiator for time-differentiating the signal from the first differentiator, a squarer for squaring the signal from the first differentiator, a multiplier for multiplying the output from the second differentiator by the signal from the rotary sensor, a subtractor for calculating the difference between the output from the squarer and the output from the multiplier, and a detector for detecting a wheel velocity based on the output from the subtractor.

Advantageously, the wheel velocity detecting apparatus according to the present invention may further comprise a transformer for transforming a signal from the rotary sensor into a square-wave, a second detector for detecting a wheel velocity based on an edge interval of the square wave and the circumference of the wheel, and a compensator for compensating the wheel velocity detected by the detector based on the wheel velocity detected by the detector and the wheel velocity detected by the second detector.

DETAILED DESCRIPTION OF THE PREFERRED EMBODIMENT

Figure 1:
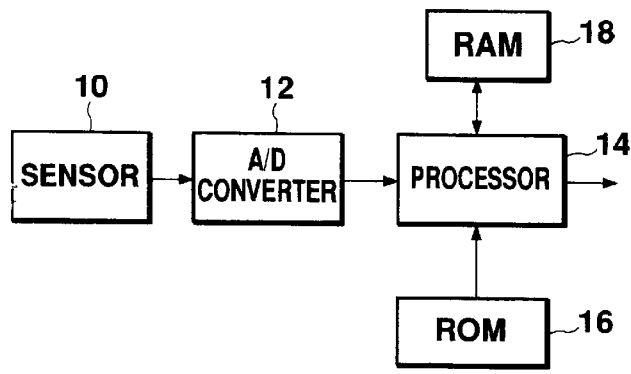
FIG. 1 is a block diagram illustrating the configuration of an embodiment of the present invention.

Referring to the drawings, typical embodiments of the present invention will hereinafter be described.

First Embodiment

In FIG. 1, a block diagram illustrating the configuration of the present embodiment is shown. A rotary sensor 10 is arranged near a wheel to output a sensor signal at a frequency corresponding to a rotational speed of the wheel. Alternatively, as a rotary sensor, for example, a generating rotary sensor or the like using a permanent magnet and a detecting coil may be used. The sensor signal is fed to an A/D converter 12.

The A/D converter 12 samples a signal from the rotary sensor 10 at predetermined sampling timing (for example, 5 msec) to convert it into a digital signal, which is fed to a processor 14.

The processor 14 processes the digital signal using a coefficient stored in ROM 16 or RAM 18 to detect and output a wheel velocity. Further, the processor 14, the ROM 16, and the RAM 18 may be formed of a microcomputer. In addition, the coefficient is necessary for detecting an actual wheel velocity from a physical quantity derived by processing the sensor signal, so details of the coefficient will be described later.

Figure 2:
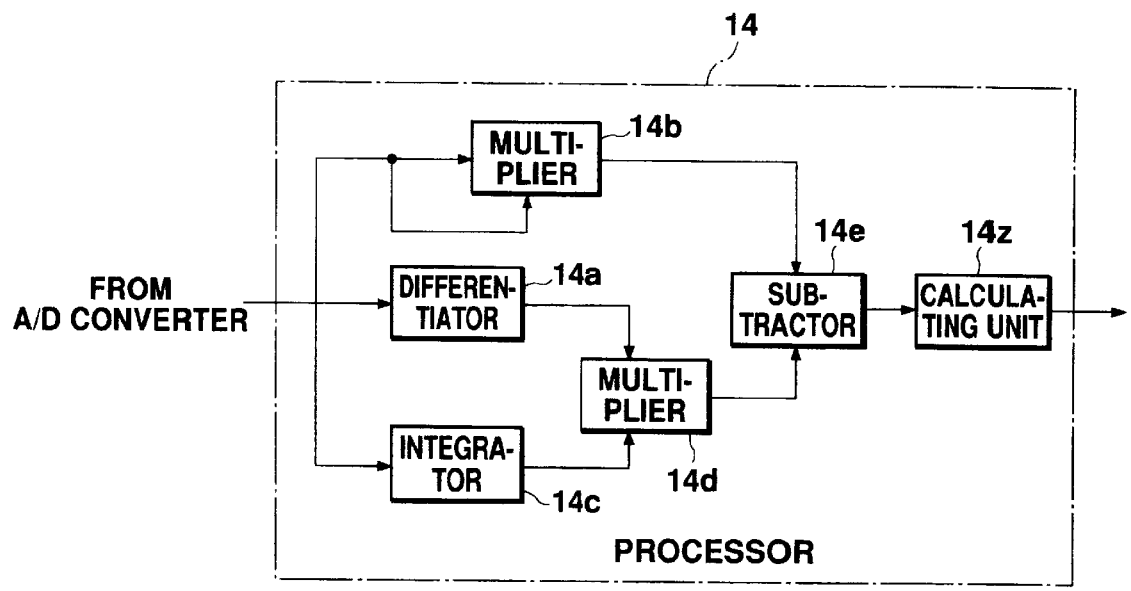
FIG. 2 is a functional block diagram of a processor 14 in a first embodiment.

In FIG. 2, a block diagram of functions contained in the processor 14 is shown. The functions of the processor 14 include, as shown, a differentiator 14a, multipliers 14b and 14d, an integrator 14c, and a subtractor 14e, and are characterized by processing a digital signal from the A/D converter 12 to detect a wheel velocity, without transforming the digital signal into a square wave as before. The contents of processing in the processor 14 will be described in detail hereinafter.

A digital sensor signal from the A/D converter 12 is, as shown in FIG. 2, fed to the differentiator 14a, the multiplier 14b, and integrator 14c, respectively. Now, when a sensor signal is expressed by:

$$y = f(\omega)\cos(\omega t) \quad (1)$$

the differentiator 14a time-differentiates the signal and outputs $$dy/dt = -f(\omega)\cdot\omega\cdot\sin(\omega t) \quad (2)$$

The differentiated output from the differentiator 14a is then fed to the multiplier 14d.

Besides, the multiplier 14b squares the digital sensor signal from the A/D converter 12, that is, outputs:

$$y^2 = f^2(\omega)\cos^2(\omega t) \quad (3)$$

Then, the output from the multiplier (squarer) 14b is fed to the subtractor 14e.

Besides, the integrator 14c time-integrates the digital sensor signal from the A/D converter 12, that is, calculates:

$$\int y\,dt = f(\omega)\cdot 1/\omega\cdot\sin(\omega t) \quad (4)$$

and feeds the output to the multiplier 14d.

The multiplier 14d multiplies the differentiated signal from the differentiator 14a by the integrated signal from the integrator 14c. In other words, the multiplier 14d calculates:

$$dy/dt\cdot\int y\,dt = -f^2(\omega)\sin^2(\omega t) \quad (5)$$

The product output from the multiplier 14d is then fed to the subtractor 14e.

The subtractor 14e is fed with both the squared output from the multiplier 14b and the product output from the multiplier 14d to calculate the difference therebetween. The result of the calculation is:

$$y^2 - dy/dt\cdot\int y\,dt = f^2(\omega) \quad (6)$$

where f(ω) is the amplitude of the sensor output, which is a function that varies depending on ω, the rotational speed of a wheel, or a function that is uniquely determined depending on the value of ω (a function which monotonically increases corresponding to ω). Accordingly, f(ω) may be measured beforehand to store the functional value thereof in the ROM 16 or RAM 18, such that a wheel velocity may be detected by using f²(ω) calculated as shown in the formula (6) by the subtractor 14e (in practice, by using the square root from the subtractor 14e). In other words, a calculating unit 14z (detector) in the processor may calculate the square root of the output from the subtractor 14e and read out a coefficient (gradient K in the case where the functional value f(ω) is set as f(ω)=Kω) from the ROM 16 or RAM 18 to calculate ω which is equal to the wheel velocity.

The value of f(ω) represents the amplitude of the sensor signal, and this can be measured sufficiently accurately even if ω is smaller than the case where the edge interval of the square wave is measured. Therefore, according to a processing circuit of the embodiment, the wheel velocity can be detected at high accuracy in a very low wheel velocity range (10 km/h or lower).

Second Embodiment

Figure 3:
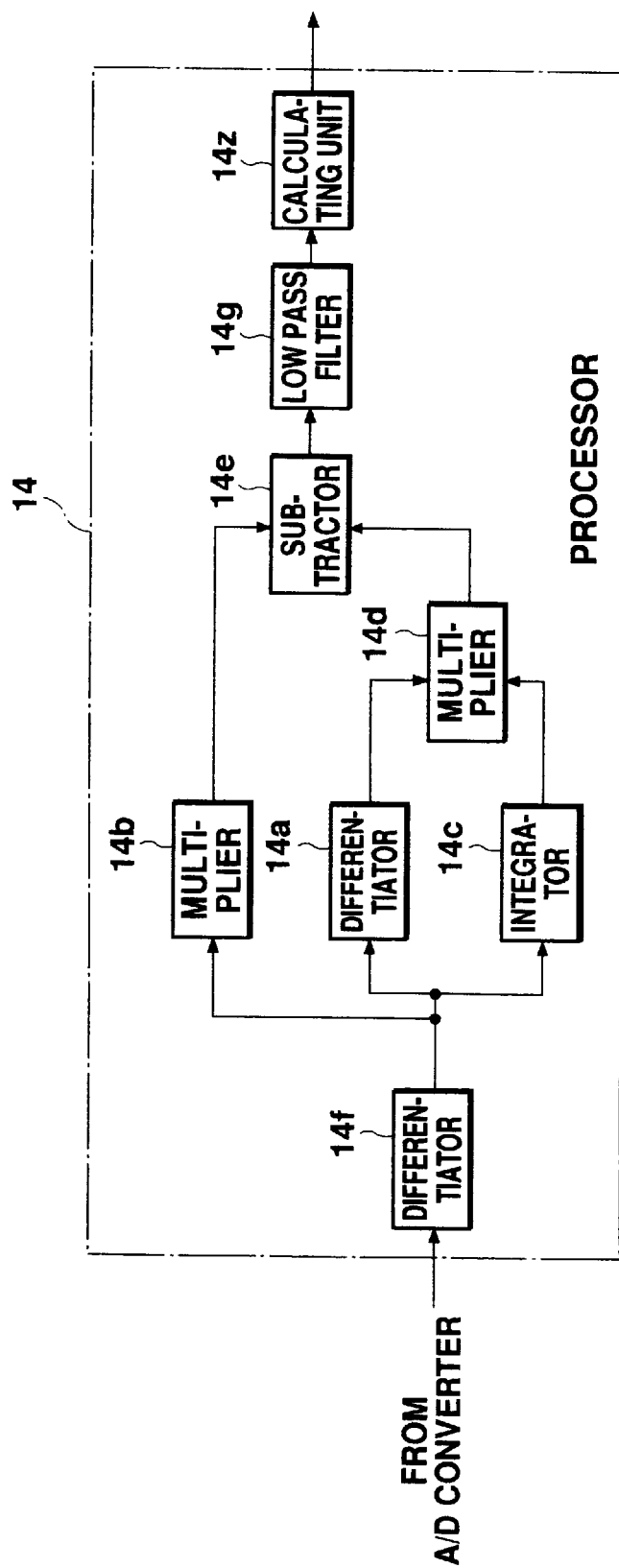
FIG. 3 is a functional block diagram of a processor in a second embodiment.

In FIG. 3, a block diagram of functions in a processor 14 according to the present embodiment is shown. The block diagram of the present embodiment is generally the same as the block diagram illustrating the configuration shown in FIG. 1, and a sensor signal converted into a digital signal by an A/D converter 12 is fed to the processor 14.

The functions of the processor 14 in the present embodiment are the same as the functions in FIG. 2, with addition of a differentiator 14f and a low pass filter 14g. The differentiator 14f is arranged in a stage previous to the differentiator 14a, multiplier 14b, and integrator 14c, and the low pass filter 14g is placed in a stage after to the integrator 14e.

The processing of the present embodiment will be described in detail hereinafter.

A digital sensor signal from the A/D converter 12 is first fed to the differentiator 14f. The differentiator 14f time-differentiates and outputs the digital sensor signal. Specifically, when the sensor signal is expressed by y=f(ω) sin(ωt), $$dy/dt = \omega f(\omega)\cos(\omega t) \quad (7)$$

is calculated and fed to the differentiator 14a, the multiplier 14b, and the integrator 14c.

In the differentiator 14a, the differentiated signal from the differentiator 14f is further differentiated. In other words, the following formula is calculated:

$$d(dy/dt)/dt = -\omega^2 f(\omega)\sin(\omega t) \quad (8)$$

and the result is fed to the multiplier 14d.

Also, the multiplier (squarer) 14b squares the differentiated signal from the differentiator 14f. In other words, the following formula is calculated:

$$(dy/dt)^2 = \omega^2 f^2(\omega)\cos^2(\omega t) \quad (9)$$

and the result is fed to the subtractor 14e.

Meanwhile, the integrator 14c time-integrates the differentiated signal from the differentiator 14f. In other words, the following formula is calculated:

$$\int (dy/dt)dt = f(\omega)\sin(\omega t) \quad (10)$$

and the result is fed to the multiplier 14d.

In the multiplier 14d, the differentiated output from the differentiator 14a is multiplied by the integrated output from the integrator 14c. In other words, the following formula is calculated:

$$d(dy/dt)/dt\cdot\int (dy/dt)dt = -\omega^2 f^2(\omega)\sin^2(\omega t) \quad (11)$$

and the result is fed to the subtractor 14e.

The squared output from the multiplier 14b and the product output from the multiplier 14d are inputted to the subtractor 14e in order to calculate the difference therebetween. In other words, the following formula is calculated:

$$(dy/dt)^2 - d(dy/dt)/dt\cdot\int (dy/dt)dt = \omega^2 f^2(\omega) \quad (12)$$

and the result is fed to the low pass filter 14g.

The low pass filter 14g, removes a high pass component of $\omega^2 f^2(\omega)$ as noise, to generate the output.

When, for example, a GMR (Giant Magneto Resistance) sensor or the like is used here as the sensor 10, since f (ω)

is constant irrespective of ω, ω or rotational frequency (wheel velocity) can be detected based on the output from the low pass filter 14g, if the value of f(ω) has been measured beforehand and stored in ROM 16 or RAM 18. Specifically, the calculating unit 14z (detector) within the processor 14 may calculate the square root of the output from the low pass filter 14g, and divide the square root by the stored value of f(ω) read from the ROM 16 or RAM 18 to derive ω.

Figure 8:
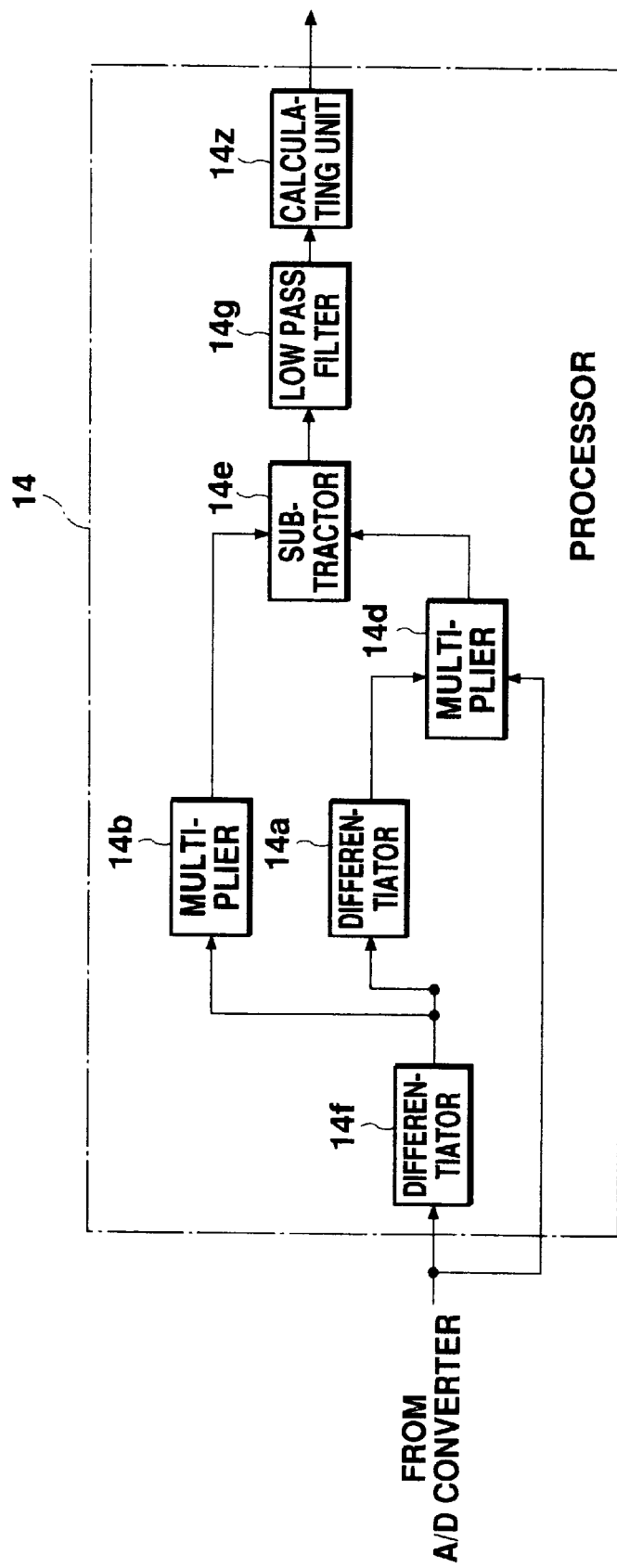
FIG. 8 is a block diagram illustrating the configuration of another processor in the second embodiment.

Further, in this embodiment, although the differentiated output from the differentiator 14a is multiplied by the integrated output from the integrator 14c in the multiplier 14d, the output from the integrator 14c is exactly the signal from the rotary sensor, as is also apparent from the formula (10). Therefore, it will be appreciated by a person skilled in the art that, in a configuration of FIG. 3, a similar advantage is obtained even if the signal from the rotary sensor is outputted directly to the multiplier 14d, while eliminating the integrator 14c. The configuration of this case is shown in FIG. 8.

Third Embodiment

In the first embodiment described above, the output from the subtractor 14e is $f^2(\omega)$ (or f(ω), the square root thereof, which is hereinafter treated as output), and if a gap between the sensor 10 and a rotating body (wheel), which is a sensor rotor, is fixed, a sensor electromotive force f(ω) is uniquely determined when the rotating body (wheel) is rotating at a certain rotational frequency (ω), enabling the wheel velocity to be detected, as f(ω) is proportional to the rotational speed of the wheel, in other words, a functional relation f(ω)=Kω is satisfied.

However, when a gap between a sensor and a sensor rotor (wheel) is different from a designed value due to an assembly error or the like of the sensor 10, a coefficient K is consequently different from the designed value, causing a fear of generating variations in a finally detected velocity. Therefore, in order to detect the wheel velocity with higher accuracy, initialization is required for compensating for the variations of the gap, or the variations of the coefficient K.

Also, in the second embodiment, $\omega^2 f^2(\omega)$ (or ωf(ω), the square root thereof, hereinafter treated as output) is outputted from a low pass filter 14g, and the sensor electromotive force of f(ω) is constant, so that ω can be directly detected.

However, in this case as well, if the gap is different from the designed value due to an assembly error or the like of the sensor, the value of f(ω) is consequently varied, so that the initialization is likewise required for compensating for the variations of the gap.

In this embodiment, in view of such necessity, in order to detect the wheel velocity with higher accuracy, initialization of a coefficient (parameter) (or compensation for the coefficient) is performed.

Figure 4:
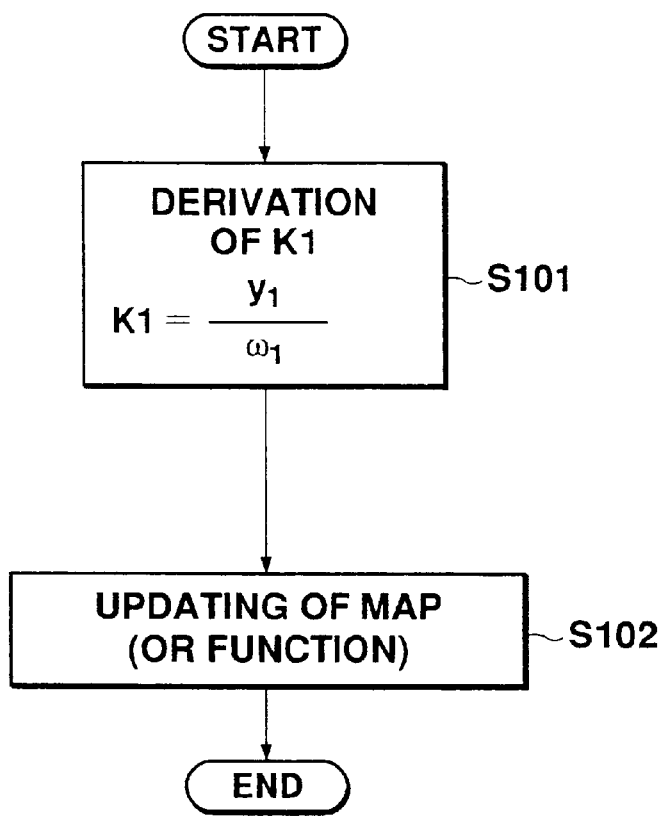
FIG. 4 is a processing flow chart in a third embodiment.
Figure 5:
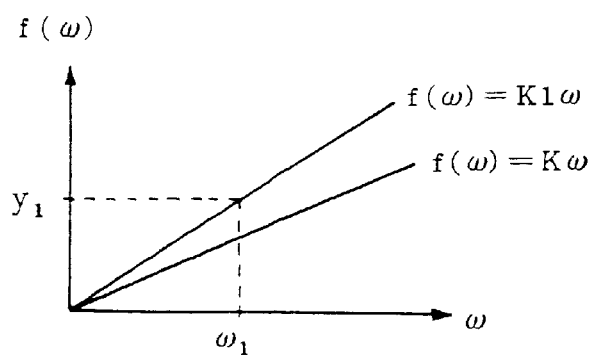
FIG. 5 is a graph illustrating the relationship between an electromotive output and a rotational speed in the third embodiment.

In FIG. 4, a flow chart for initialization processing in this embodiment is shown. To begin with, a sensor characteristic is initially assumed to be f(ω)=Kω, as shown in FIG. 5, and the coefficient K is stored or values of various ω and f(ω) are stored as a map under the coefficient K, in the ROM 16 or RAM 18. Then, the body of rotation (wheel) is rotated at a rotational frequency ω1, and the output y1 of a wheel velocity detecting apparatus according to the first embodiment at the time is detected. Actual gradient K1 is then derived from ω1 and y1 (S101). Specifically, K1=y1/ω1 is calculated.

After the actual coefficient K1 is thus derived, a default value K initially stored in the ROM 16 or RAM 18 is updated by this coefficient K1 (S102), and thereafter the updated coefficient K1 (or values of various ω and f(ω) stored as the map under the coefficient K) is used to detect the wheel velocity. Thus, even if the gap varies, the wheel velocity can be detected with high accuracy, as the coefficient K1 is set up in accordance with the varying gap.

Further, also in the wheel velocity detecting apparatus according to the second embodiment, a wheel is similarly rotated at a rotational frequency ω1, an accurate value of f(ω) is derived from the output y1 of the wheel velocity detecting apparatus at the time, and a default value stored in the ROM 16 or RAM 18 may be updated thereby.

Figure 6:
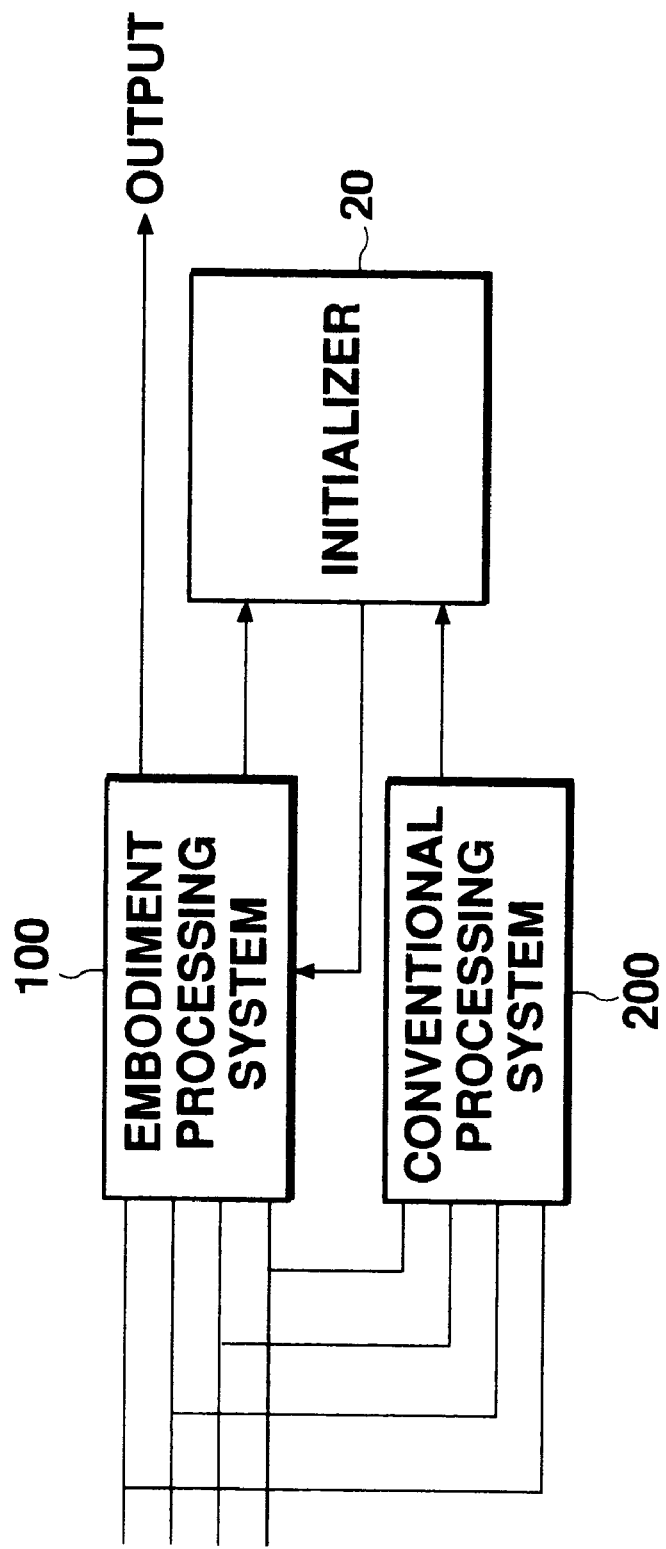
FIG. 6 is a block diagram illustrating the configuration in the third embodiment.

On the other hand, in FIG. 6, a block diagram illustrating the configuration for performing another initialization process in the present embodiment is shown. In this initialization method, in addition to the processing system 100 in the first embodiment or the second embodiment, the conventional processing system 200, where a sensor signal is transformed into a square wave pulse and a wheel velocity is detected based on an edge interval of the square wave pulse and the circumference of the wheel, is also used.

Specifically, data of the wheel velocity detected by the processing system 100 of the first embodiment or the second embodiment and data of the wheel velocity detected by the conventional processing system 200 are fed together to an initializer 20. In the initializer 20, data of wheel velocity from both of the processing systems are compared, and in a medium or high wheel velocity range where wheel velocity can be detected at high accuracy by the conventional processing system 200, the coefficient of the processing system 100 in the first or the second embodiment is adjusted based on the wheel velocity data detected by the conventional processing system 200.

Figure 7:
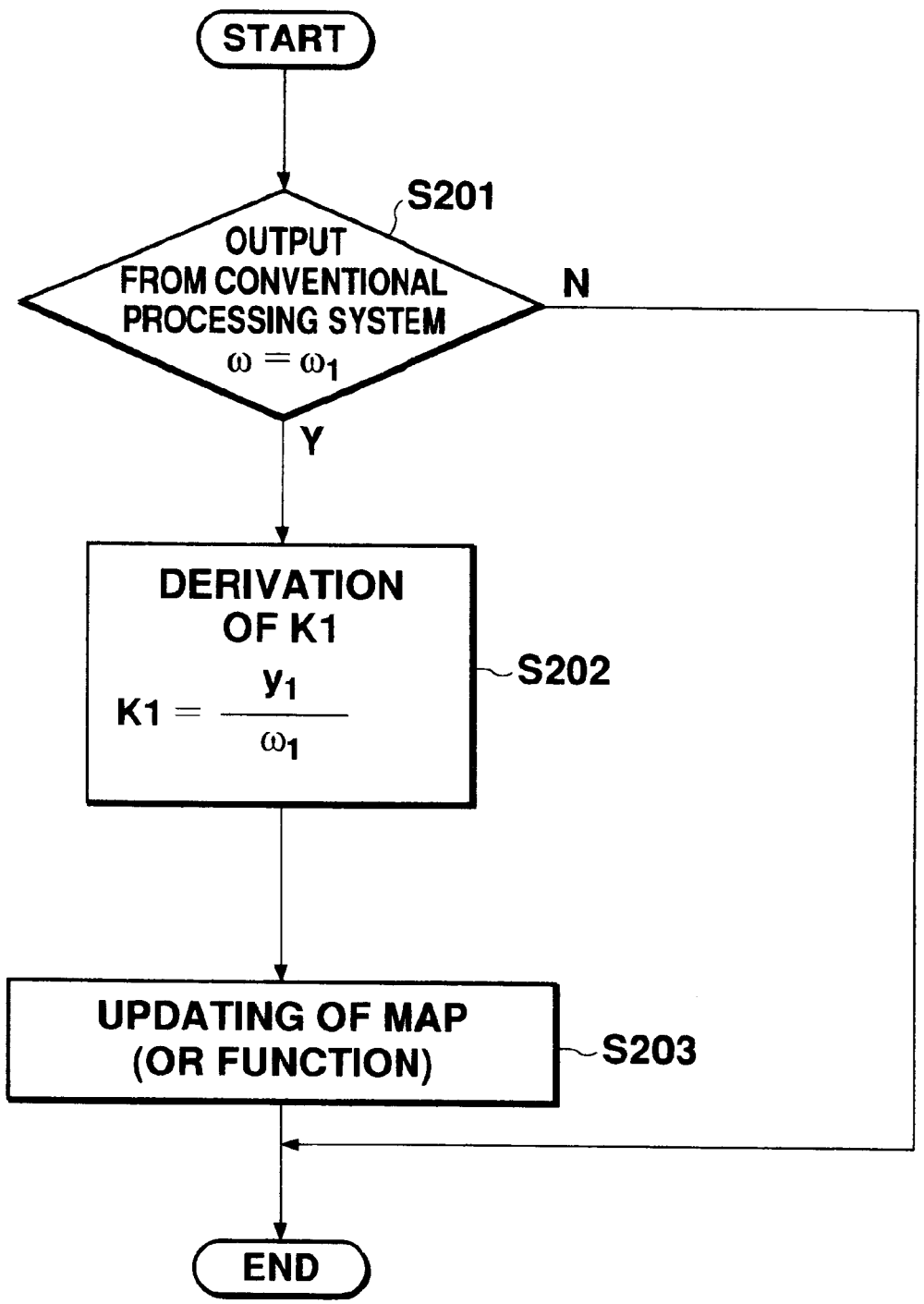
FIG. 7 is another processing flow chart in the third embodiment.

In FIG. 7 a flow chart for performing the initialization using the configuration block diagram as shown in FIG. 6 is shown. The processing system shown in the first embodiment as the embodiment processing system 100 is used, and the sensor characteristic is initially assumed to be f(ω)=Kω. The coefficient K (or a combination of various values of ω and f(ω) under the coefficient K) is stored as a default value in the ROM 16 or RAM 18.

Next, it is determined whether or not the wheel velocity ω derived from the conventional processing system 200 is ω1 or in a medium or high wheel velocity range (S201). When the wheel velocity data obtained by the conventional processing system 200 is ω1, which is in the medium or high wheel velocity range (velocity exceeding at least 10 km/h), the initializer 20 derives the coefficient K1 from the ω1 and the output y1 of the processing system 100 in the first embodiment (S202). Specifically, K1=y1/ω1 is calculated. Further, the coefficient K1 thus derived is used to update the value of the default coefficient K (or to replace the map under the coefficient K1) stored in the ROM 16 or RAM 18 by replacing the latter with the former (S203). Similar processing is performed when the processing system of the second embodiment is used.

As above described, when a sufficiently high accuracy is obtained in the conventional processing system 200, the accuracy in the wheel velocity detecting in the very low velocity range by the processing system in the present embodiment can be improved, by updating the coefficient of the processing system in the present embodiment with the wheel velocity data detected at high accuracy.

While the typical embodiments of the present invention have been described as above, it is generally known that a wheel velocity is accompanied by harmonics having as a basic frequency the frequency of the rotational speed of a tire due to lack of uniformity of the radius thereof. In the respective embodiments where a signal from a rotary sensor is directly processed to detect a wheel velocity, if the harmonics appear in the sensor signal, a result of a calculation is inevitably affected. Therefore, it may also be preferred to provide in a front stage a trap filter corresponding to the rotational frequency detected by the respective embodiments such that the harmonics are eliminated from the sensor signal.

As described in the foregoing, according to the present invention, the accuracy in wheel velocity detecting can be significantly improved in a very low velocity range(10 km/h or lower)

What is claimed is:

1. A wheel velocity detecting apparatus for detecting a wheel velocity based on a signal from a rotary sensor, comprising:
    a differentiator for time-differentiating the signal from said rotary sensor;
    an integrator for time-integrating the signal from said rotary sensor;
    a squarer for squaring the signal from said rotary sensor;
    a multiplier for multiplying the output from said differentiator by the output from said integrator;
    a subtractor for calculating the difference between the output from said squarer and the output from said multiplier; and
    a detector for detecting a wheel velocity based on the output from said subtractor.

2. A wheel velocity detecting apparatus according to claim 1, further comprising:
    a transformer for transforming the signal from said rotary sensor into a square wave;
    a second detector for detecting a wheel velocity based on an edge interval of said square wave and the circumference of a wheel; and
    a compensator for compensating for a wheel velocity detecting parameter in said detector based on the wheel velocity detected by said detector and the wheel velocity detected by said second detector.

3. A wheel velocity detecting apparatus for detecting wheel velocity based on a signal from a rotary sensor, comprising:
    a first differentiator for time-differentiating the signal from said rotary sensor;
    a second differentiator for time-differentiating the signal from said first differentiator;
    an integrator for time-integrating the signal from said first differentiator;
    a squarer for squaring the signal from said first differentiator;
    a multiplier for multiplying the output from said second differentiator by the output from said integrator;
    a subtractor for calculating the difference between the output from said squarer and the output from said multiplier; and
    a detector for detecting wheel velocity based on the output from said subtractor.

4. A wheel velocity detecting apparatus according to claim 3, further comprising:
    a transformer for transforming the signal from said rotary sensor into a square wave;
    a second detector for detecting wheel velocity based on an edge interval of said square wave and the circumference of a wheel; and
    a compensator for compensating for a wheel velocity detecting parameter in said detector based on wheel velocity detected by said detector and wheel velocity detected by said second detector.

5. A wheel velocity detecting apparatus for detecting wheel velocity based on a signal from a rotary sensor, comprising:
    a first differentiator for time-differentiating the signal from said rotary sensor;
    a second differentiator for time-differentiating the signal from said first differentiator;
    a squarer for squaring the signal from said first differentiator;
    a multiplier for multiplying the output from said second differentiator by the signal from said rotary sensor;
    a subtractor for calculating the difference between the output from said squarer and the output from said multiplier; and
    a detector for detecting wheel velocity based on the output from said subtractor.

6. A wheel velocity detecting apparatus according to claim 5, further comprising:
    a transformer for transforming the signal from said rotary sensor into a square wave;
    a second detector for detecting wheel velocity based on an edge interval of said square wave and the circumference of a wheel; and
    a compensator for compensating for a wheel velocity detecting parameter in said detector based on the wheel velocity detected by said detector and the wheel velocity detected by said second detector.

* * * * *

UNITED STATES PATENT AND TRADEMARK OFFICE
CERTIFICATE OF CORRECTION

PATENT NO.    : 6,230,110 B1
DATED         : May 8, 2001
INVENTOR(S)   : Katsuhiko Iwazaki It is certified that error appears in the above-identified patent and that said Letters Patent is hereby corrected as shown below:

<u>Column 7,</u>
Line 11, after "lower)" insert -- . --

Signed and Sealed this

Eleventh Day of June, 2002

Attest:

Attesting Officer

JAMES E. ROGAN
*Director of the United States Patent and Trademark Office*